March 30, 1937. U. R. MEYERS 2,075,588
MIRROR AND PICTURE FRAME
Filed June 22, 1936
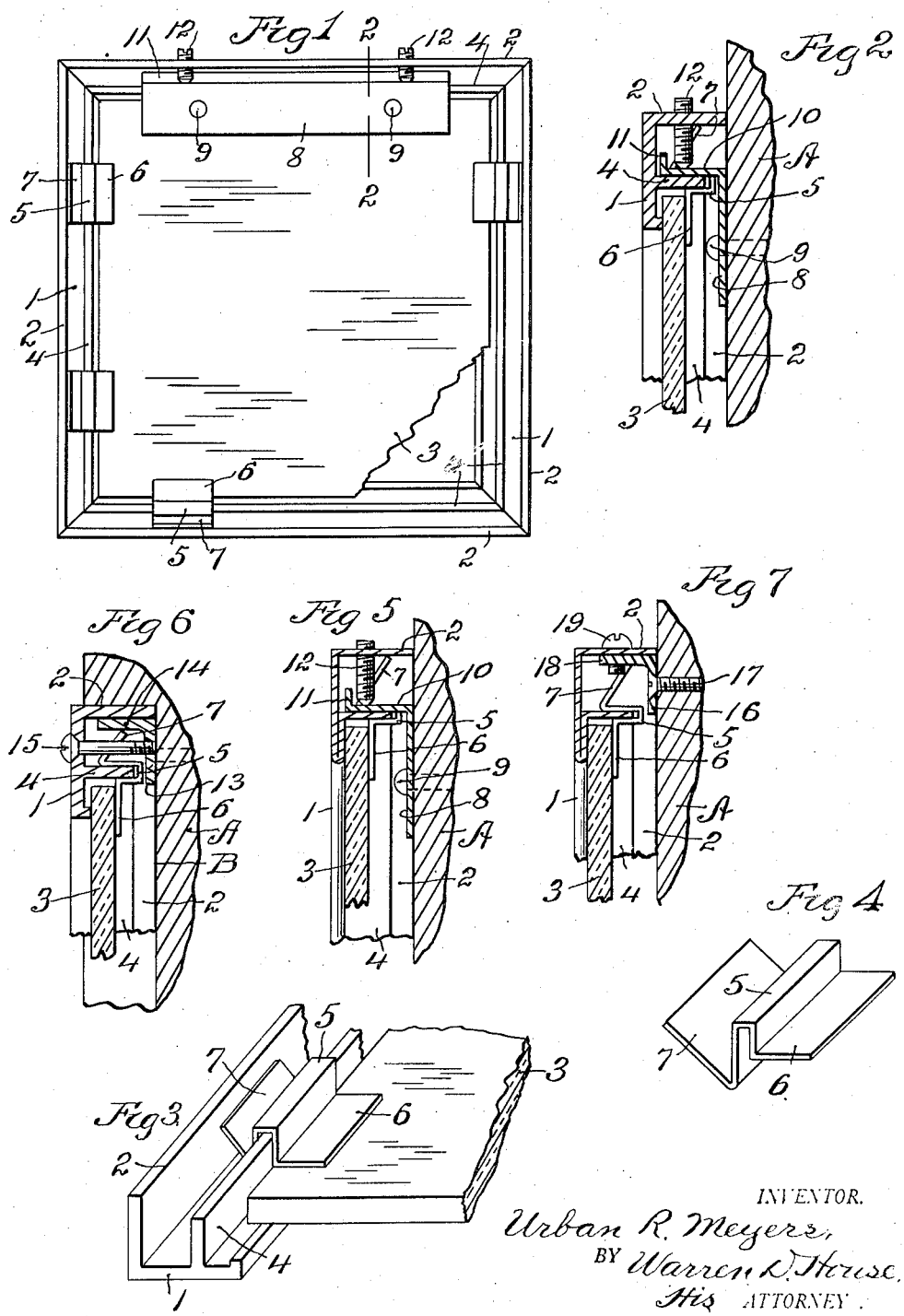

Patented Mar. 30, 1937

2,075,588

UNITED STATES PATENT OFFICE 2,075,588

MIRROR AND PICTURE FRAME

Urban R. Meyers, Kansas City, Mo., assignor of one-third to James V. Lewis and one-sixth to Wiles L. Gillespie, both of Kansas City, Mo.

Application June 22, 1936, Serial No. 86,624

11 Claims. (Cl. 40—152)

My invention relates to improvements in mirror and picture frames.

One of the objects of my invention is the provision of a novel frame adapted to securely hold the glass plate of a mirror or picture in a manner such that it is not liable to damage by rough usage, which provides for the assemblage of the glass plate and the frame as a unit for attachment to or detachment from a suitable support, which is cheap to make, strong, durable and not likely to get out of order.

A further object of my invention is the provision of novel means for attaching the frame to a suitable support without liability of damage to the glass plate, and which prevents the easy and quick removal by an unauthorized person.

The novel features of my invention are hereinafter fully described and claimed.

In the accompanying drawing which illustrates my invention,

Fig. 1 is a rear view, partly broken away of one form of my invention.

Fig. 2 is an enlarged section on the line 2—2 of Fig. 1.

Fig. 3 is an enlarged fragmental perspective view of part of the frame, one of the fastening clips, and part of the glass plate of the structure shown in Figs. 1 and 2.

Fig. 4 is an enlarged perspective view of one of the fastening clips.

Fig. 5 is a view similar to Fig. 2, showing a modification of the frame.

Fig. 6 is a view similar to Fig. 2 showing a modification of the frame supporting means, with the frame mounted in a recess in a wall.

Fig. 7 is a view similar to Fig. 2, showing another modification of the frame and of the supporting means.

Similar characters of reference designate similar parts in the different views.

1 designates the front wall and 2 the side wall of a frame comprising an annular member of right angled cross section which encircles a glass plate 3 that bears against the rear side of the front wall 1, and which may be the plate glass of a mirror, or a glass plate in front of a picture, not shown.

The frame is provided with spacing means for holding the glass plate 3 spaced from the side wall 2, thereby reducing the liability of damage to the glass by rough usage. Such spacing means, as shown in Figs. 1, 2, 3 and 6, comprises flanges 4 extending rearwardly from the front wall 1 to a depth less than the depth of the side wall 2, and spaced from and parallel with the side wall 2.

The frame may be of any desired form, as circular, oval, rectangular or square, as shown in Fig. 1, the glass plate 3 being shaped to correspond with the shape of the frame.

The flanges 4, as shown in Fig. 1, are respectively adjacent to and parallel with the edges of the glass plate 3 and serve to position the glass plate 3 and retain it spaced from the side wall 2.

For releasably holding the glass plate 3 firmly against the rear side of the front wall 1, any suitable means may be provided. In the drawing the means illustrated comprise clips, each having an inverted U-shaped portion 5 adapted to be fitted over the rear edge of one of the flanges 4, one arm of the U having a lateral flange 6 which bears against the rear side of the glass plate 3 and holds the latter against the rear side of the front wall 1.

From the other arm of the U extends rearwardly at an acute angle a flange 7 which is adapted to bear tightly against the inner side of the adjacent side wall 2. The clips are each composed of resilient material, such as sheet steel or sheet brass having a substantial amount of resiliency. The clips are so dimensioned that the flange 7 must be compressed toward the U or channel shaped portion 5 when the latter is fitted over a flange 4, as shown. Such compression of a clip causes the flange 7 thereof to hug tightly against the side wall 2, and the adjacent arm of the U-shaped portion 5 to hug tightly against the outer side of the flange 4, thereby holding the clip from rearward slipping, so that the clips firmly hold the glass plate 3 against the front wall 1.

The frame shown in Figs. 1, 2, 3 and 6 has relatively thick front and side walls, and it may be made by casting or rolling and the pieces forming the top and bottom and sides of the frame are mitered and fastened together in the usual manner.

In the form of frame shown in Figs. 5 and 7, the members are made by folding relatively thin sheet metal corresponding in shape to the frame members shown in Figs. 2 and 6, the flange 4 being produced by folding a portion of the front wall 1 flatwise on the inner side, and then rearwardly at right angles.

For supporting the frame on a wall or other suitable support A, there is provided in the form shown in Figs. 1, 2 and 5 a supporting member comprising a metal plate 8, which is fastened to the wall by screws 9, and which has a portion 10 extending forwardly between the side wall 2 which is at the upper side of the frame and the flange 4 next below, the forward edge of the portion 10 being extended upwardly to form a retaining projection 11 disposed in front of and adapted to have holding engagement with a screw 12 removably fitted in a threaded hole in the wall 2 over the portion 10.

The screw 12 bears against the upper side of the portion 10 and causes the flange 4 next thereunder to tightly hug against the under side of the portion 10 of the supporting member, thus holding the frame from being swung off from the supporting member 8. The projecting flange 11 by engaging the screw 12 limits the forward movement of the frame on the portion 10.

In the form shown in Fig. 5, the supporting means corresponds to that shown in Figs. 1 and 2, just described.

In the form shown in Fig. 6, the frame is fitted in a recess B provided in the wall A. On the wall in the recess B is fastened a horizontal angle bar the vertical flange 13 of which is fastened to the wall A, the other flange 14 extending forwardly and bearing against and supporting the upper side 2 of the frame at the under side thereof. A screw 15 is extended through a hole in the front wall 1 of the frame, the inner end of the screw being removably fitted in a threaded hole in the flange 13 of the supporting member or angle bar. The head of the screw 15 engages the front side of the front wall 1 of the frame and holds the frame from outward movement.

In the form shown in Fig. 7 a horizontal angle bar has its vertical flange 16 fastened by a screw 17 to the wall A, the other flange 18 of the angle bar being extended forwardly between the flange 4 and the upper side 2 of the frame and bearing against the under side of said upper side 2. A screw 19 extends through a hole in said upper side 2 and is releasably fitted in a threaded hole in the flange 18, thus holding the frame from upward or outward movement.

In the forms shown in Figs. 2, 5, 6 and 7, the supporting angle member extends forwardly between the upper side of the frame and the flange 4 next below. In the forms shown in Figs. 2 and 5, the supporting member is held against the flange 4, and in the forms shown in Figs. 6 and 7, the supporting member bears against the inner side of the upper part of the frame.

Other modifications of my invention, within the scope of the appended claims, may be made without departing from the spirit of my invention.

What I claim is:—

1. In a device of the kind described, a glass plate, an annular member having a front wall against which said glass plate bears, said member having a side wall encircling said glass plate, said member having flanges between said glass plate and said side wall holding said glass plate spaced from said side wall, and means engaging said flanges and said glass plate for holding said glass plate against said front wall.

2. In a device of the kind described, a glass plate, an annular member having a front wall against which said glass plate bears, said member having a side wall encircling said glass plate, said member having positioning means holding said glass plate spaced from said side wall, and clips releasably engaging said positioning means and the rear side of said glass plate for holding the latter against said front wall.

3. In a device of the kind described, a glass plate, an annular member having a front wall against which said glass plate bears, said member having a side wall encircling said glass plate, said member having flanges extending rearwardly from said front wall between said side wall and said glass plate and holding said glass plate spaced from said side wall, and clips releasably engaging said flanges and said glass plate for holding the latter against said front wall.

4. In a device of the kind described, a glass plate, an annular member having a front wall against which said glass plate bears, said member having a side wall encircling said glass plate, said member having flanges extending rearwardly from said front wall between said glass plate and said side wall and spaced from said side wall and holding said glass plate spaced from said side wall, and resilient clips releasably embracing said flanges and held compressed between and bearing against said side wall and said flanges and engaging the rear side of said glass plate and holding the latter against said front wall.

5. In a device of the kind described, a glass plate supporting frame comprising an annular member having a front wall, a side wall and a flange extending rearwardly from said front wall and spaced from said side wall, a supporting member adapted to be fastened to a suitable support and extending forwardly between said side wall and said flange, and a releasable fastening member extending through one of said walls and having holding engagement with the latter and with said supporting member.

6. In a device of the kind described, a glass plate supporting frame comprising an annular member having a front wall and a side wall, a supporting member adapted to be fastened to a suitable support and extending forwardly at the inner side of and adjacent to said side wall, and a releasable fastening member extending through one of said walls and having holding engagement therewith and with said supporting member.

7. In a device of the kind described, a glass plate supporting frame comprising an annular member having a front wall and a side wall, a supporting member adapted to be fastened to a suitable support and extending forwardly at the inner side of and adjacent to said side wall, one of said members having a threaded hole, and a screw extending through one of said walls and having holding engagement therewith and with said supporting member and fitted in said threaded hole.

8. In a device of the kind described, a glass plate supporting frame comprising an annular member having a front wall and a side wall, a supporting member adapted to be fastened to a suitable support and having a threaded hole and extending forwardly at the inner side of and adjacent to said side wall, and a screw extending through and having holding engagement with one of said walls and fitted in said threaded hole.

9. In a device of the kind described, a glass plate supporting frame comprising an annular member having a front wall and a side wall provided therethrough with a threaded hole, a supporting member adapted to be fastened to a suitable support and extending forwardly at the inner side of and adjacent to said side wall and having an upwardly extending projection, and a screw removably fitted in said threaded hole and bearing against the adjacent side of said supporting member at the rear of said projection and adapted to be engaged by the latter to hold the frame from forward disengagement from said supporting member.

10. In a device of the kind described, a glass plate supporting frame comprising an annular member having a front wall and a side wall and a flange extending rearwardly from said front wall, said side wall having therethrough a threaded hole, a supporting member adapted to be fastened to a suitable support and extending forwardly between said side wall and said flange and bearing against said flange, and a screw releasably fitted in said threaded hole and bearing against the upper side of said supporting member, the latter having an upwardly extending projection forward of and adapted to engage said screw for holding said frame from forward disengagement from said supporting member.

11. In a device of the kind described, a glass plate supporting frame comprising an annular member having a side wall, a supporting member adapted to be fastened to a suitable support and extending forwardly and bearing against the inner side of said side wall for supporting said frame, and having a threaded hole, said side wall having therethrough a hole registering with said threaded hole, and a screw removably fitted in said holes.

URBAN R. MEYERS.